March 20, 1934.     G. M. BARNES     1,951,338
GUN CARRIAGE
Filed Sept. 9, 1930     6 Sheets—Sheet 4
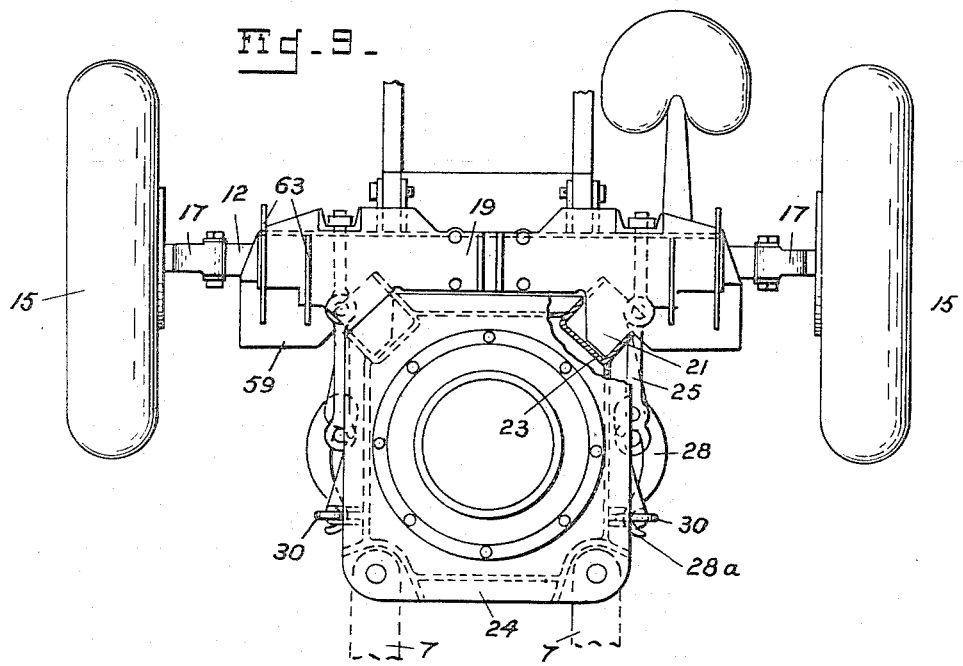
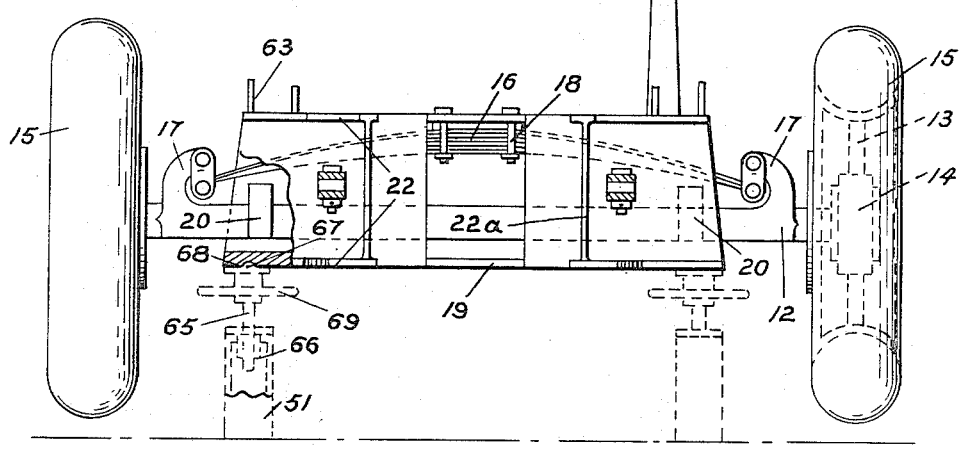
INVENTOR.
Gladeon M. Barnes
BY W. N. Roach
ATTORNEY March 20, 1934.    G. M. BARNES    1,951,338
GUN CARRIAGE
Filed Sept. 9, 1930    6 Sheets-Sheet 5
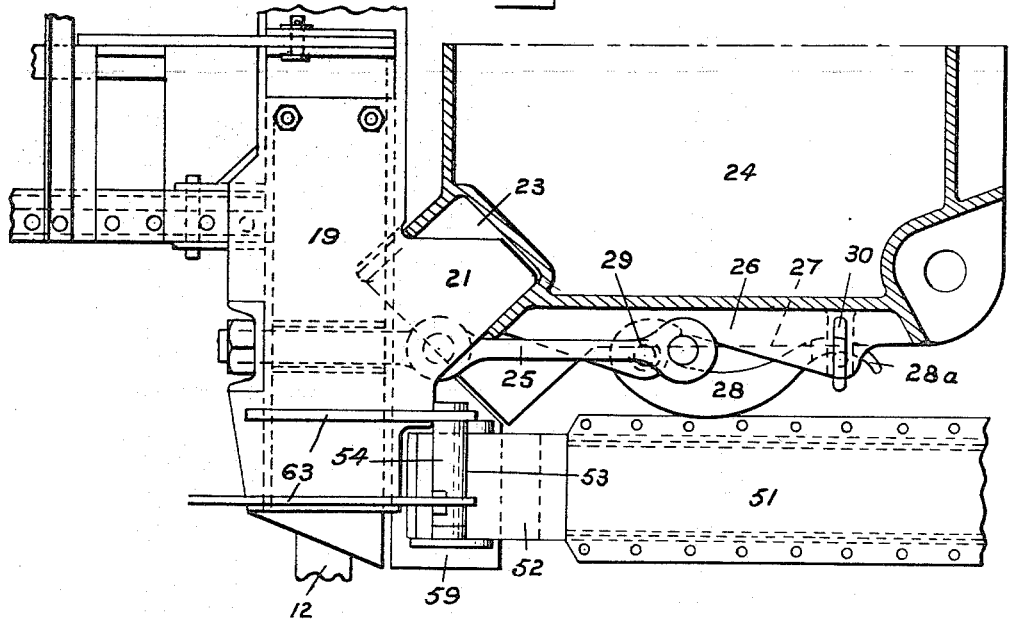
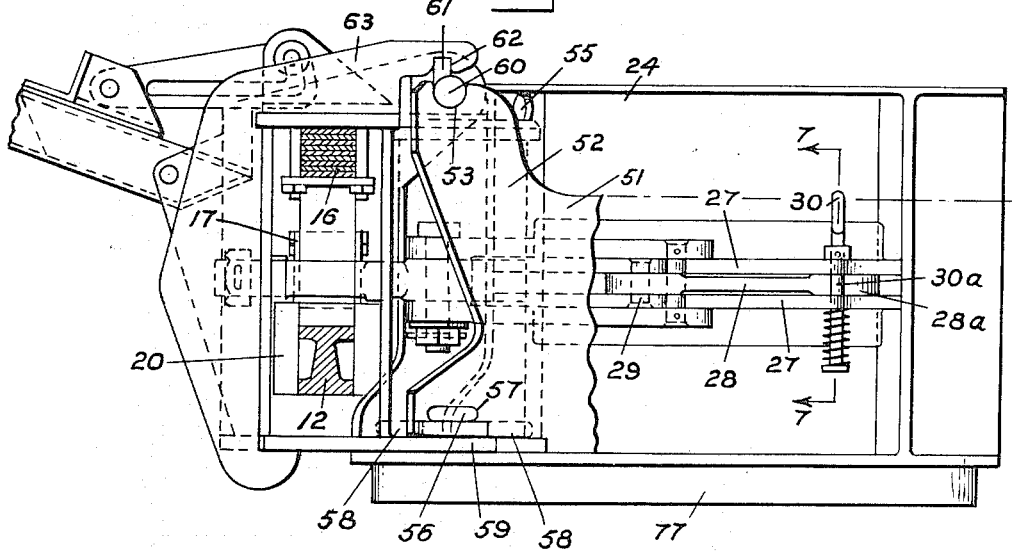
INVENTOR.
Gladeon M. Barnes
BY W. N. Roach
ATTORNEY

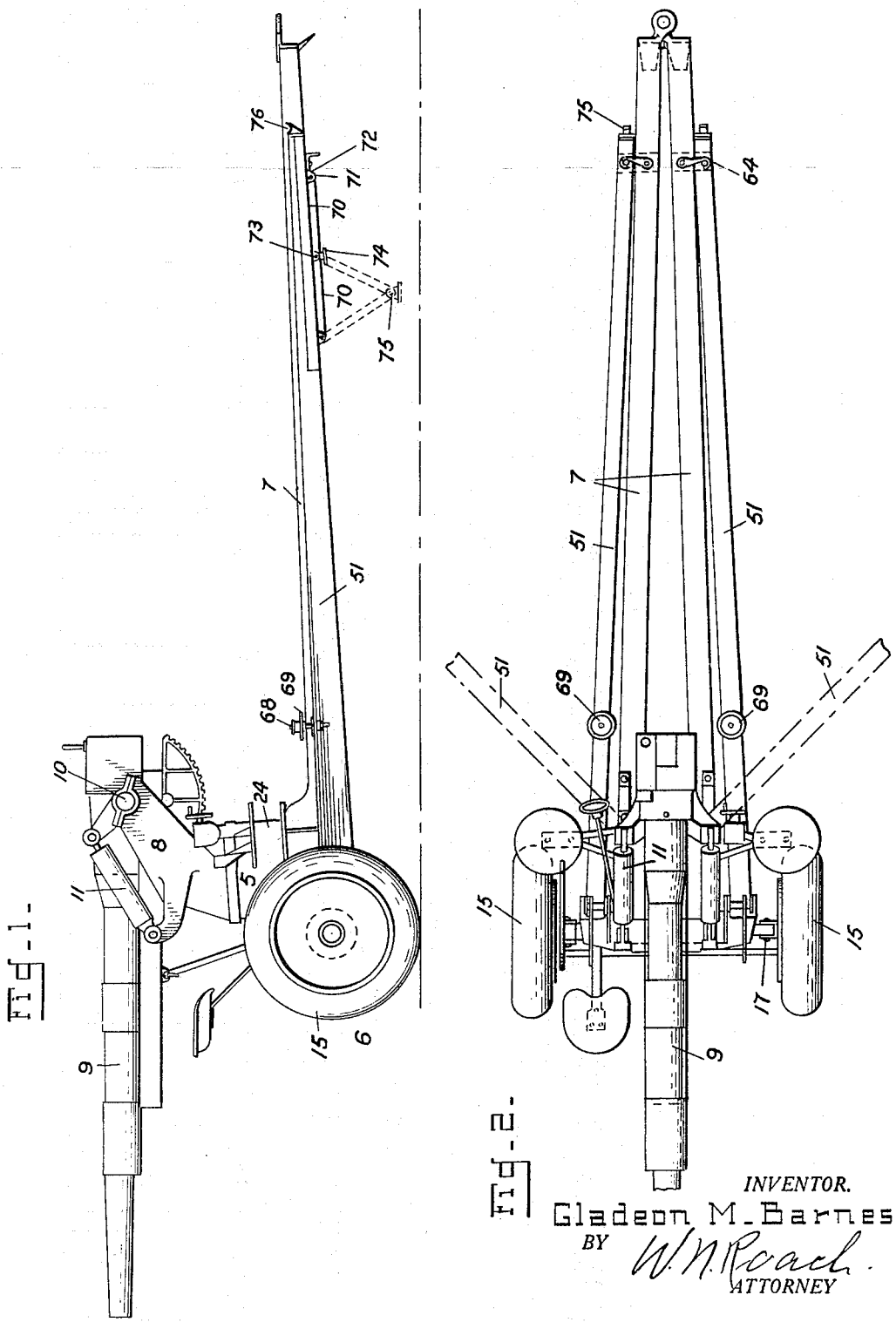

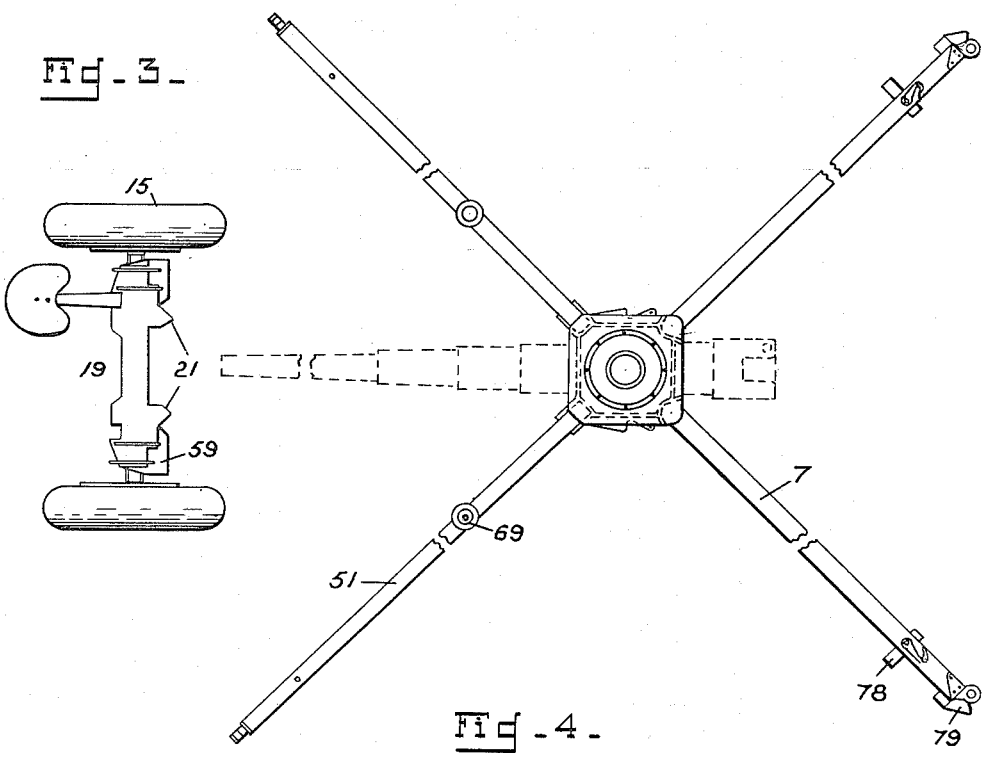
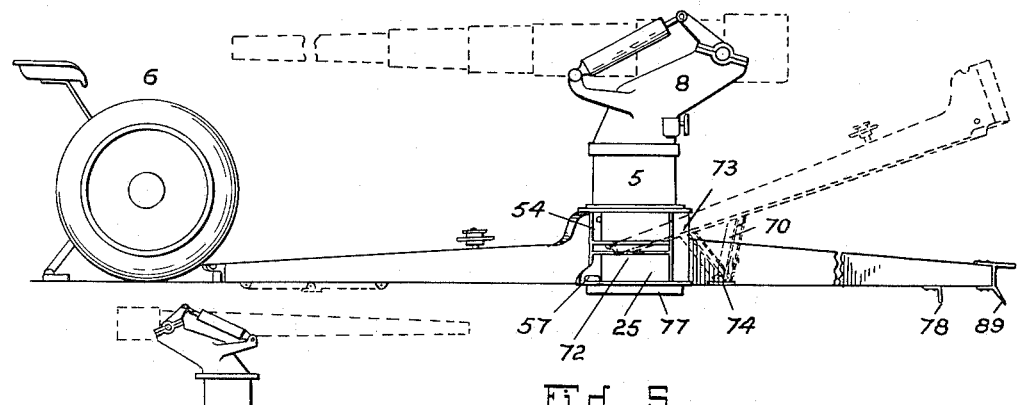
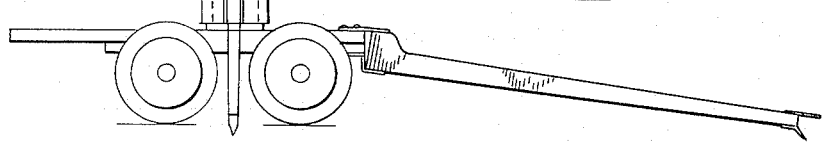

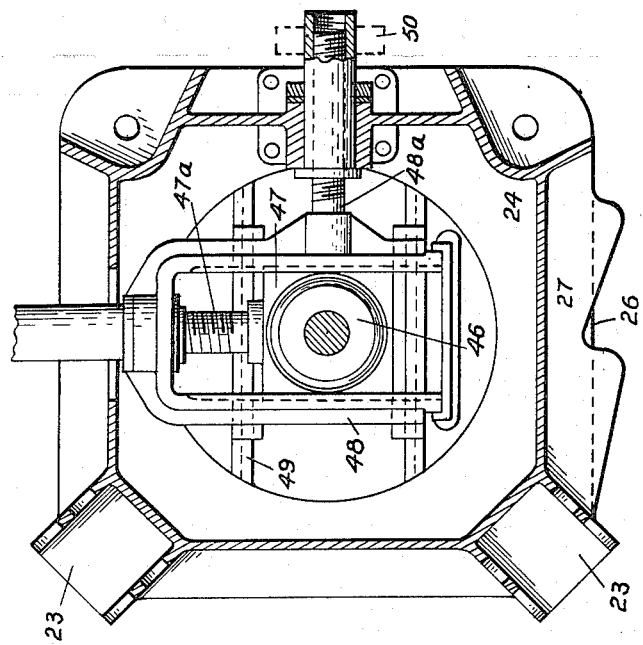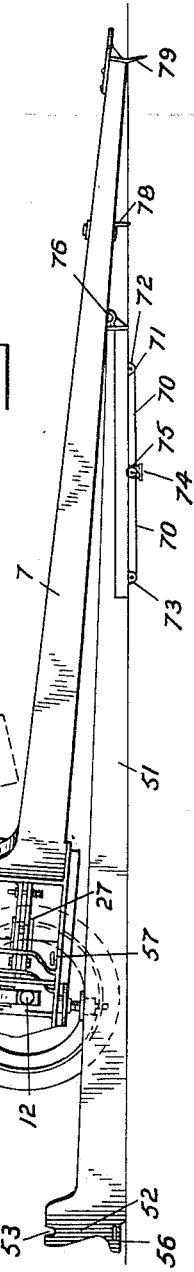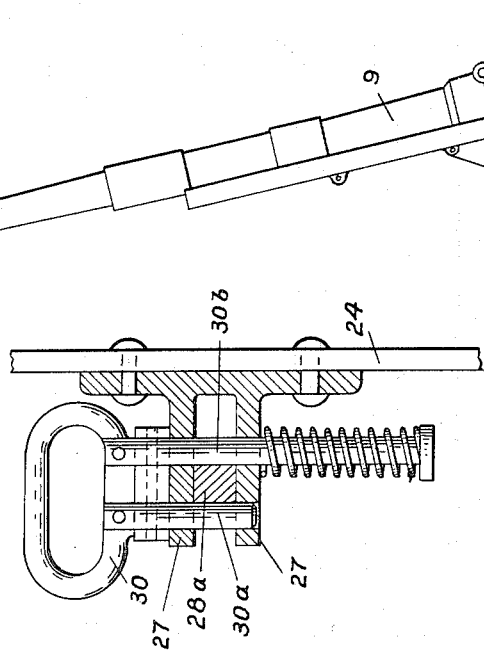

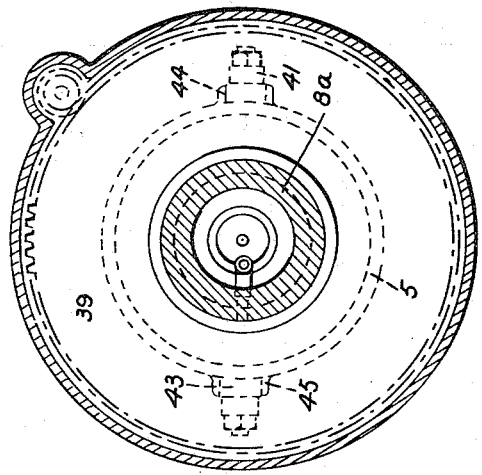
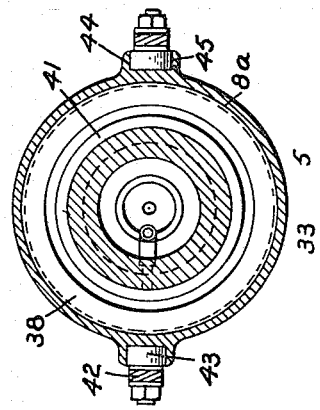
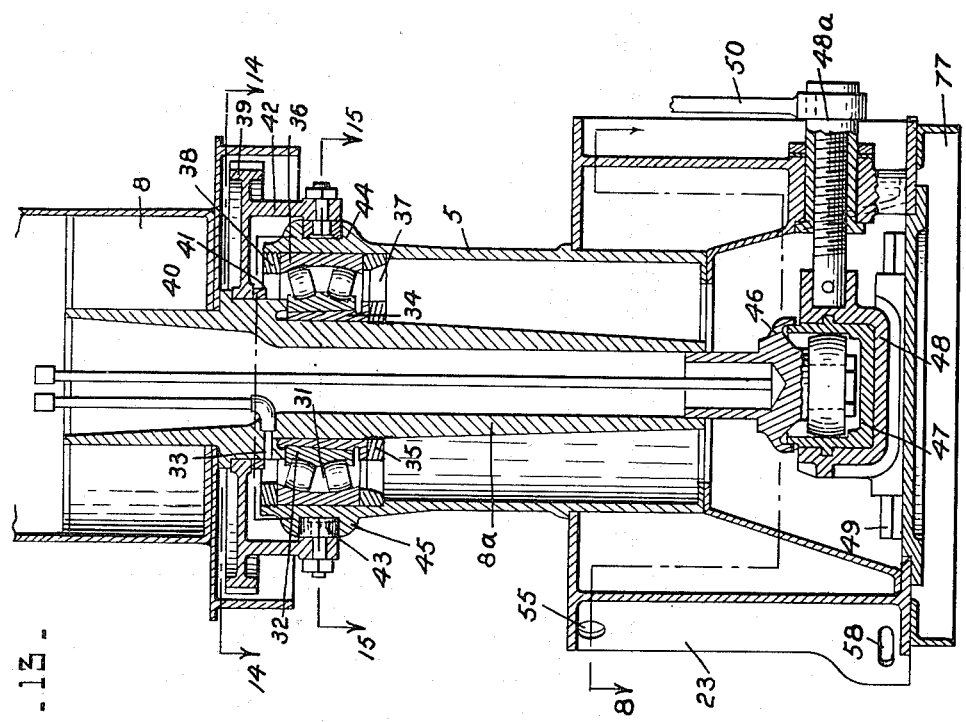

Patented Mar. 20, 1934

1,951,338

UNITED STATES PATENT OFFICE 1,951,338

GUN CARRIAGE

Gladeon M. Barnes, Hastings, Mich.

Application September 9, 1930, Serial No. 480,670

13 Claims. (Cl. 89—40)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a gun carriage.

In establishing a gun defense against aircraft it has been customary to employ special anti-aircraft guns which were not assigned a mission against ground targets. On the other hand the light field artillery employed to cooperate with infantry, and therefore available in relatively larger numbers over a given area requiring protection, has never been assigned to aerial targets because the gun mounts are not structurally capable of being pointed at high angles and traversed through wide angles, because they do not possess sufficient stability to insure the delivery of a projectile at a particular and accurately calculated point in space and, further, because their leveling mechanisms are not applicable to an all-around field of fire.

In designing a gun carriage which is to be essentially a light field artillery weapon but capable of delivering fire against aircraft, a compromise must be effected between the characteristic requirements of two types of mount, one of which has a weight limitation whose value is less than one-half of the allowance for the other. In addition to these considerations an increase in mobility is proposed for the mount forming the subject of this invention by providing traction elements consisting of pneumatic tired wheels mounted on roller bearings. While this permits of high road speed, it necessitates the provision of means for emplacing the mount since, obviously, the gun could not be fired from the resilient platform afforded by the tires.

The carriage must be capable of being rapidly placed in and out of firing position and in the present instance a pair of outriggers that, in one position of adjustment are employed as rails to take the load of the mount off of the tires, have the further function of serving as levers to take the load of the mount and permit disconnection and removal of the wheel unit from the gun mount and subsequent lowering of the gun mount onto the ground where it is in semifixed emplacement. The outriggers are then securable to the gun mount and in conjunction with the trails establish an enlarged base resting on the ground.

A further novel arrangement contained in the present mount consists in the method of supporting a top carriage through a self-aligning spherical bearing.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation of the improved gun carriage shown in the traveling position;

Fig. 2 is a plan view of Fig. 1;

Fig. 3 is a plan view of the gun mount in semifixed emplacement, the mount resting on the ground;

Fig. 4 is a view in side elevation of Fig. 3 illustrating in dotted lines the manner of employing the outriggers to lower the gun mount to the ground;

Fig. 5 is a view in side elevation of the gun mount on a vehicle;

Fig. 6 is a view in side elevation of the gun carriage with the near wheel removed and emplaced for limited traversing movement;

Fig. 7 is a sectional view on the line 7—7 of Fig. 12;

Fig. 8 is a sectional view on the line 8—8 of Fig. 13;

Fig. 9 is a plan view of the wheeled axle unit showing the attachment of the gun mount;

Fig. 10 is a view in end elevation of the axle unit showing in dotted lines the method of employing the jacks of the outriggers;

Fig. 11 is an enlarged plan view of one-half of the pedestal attached to the wheeled axle unit;

Fig. 12 is a view in side elevation of Fig. 11;

Fig. 13 is a longitudinal sectional view through the pedestal and top carriage;

Figs. 14 and 15 are sectional views on the corresponding lines of Fig. 13.

Referring to the drawings by numerals of reference:

There is shown a gun carriage consisting generally of a pedestal mount 5 supported by a detachable wheeled axle unit 6 and by split trail members 7—7 and supporting a top carriage 8 of typical anti-aircraft design in which a gun 9 is trunnioned as at 10 adjacent the breech to provide for high angle firing. The muzzle preponderance of the tipping parts is counter-balanced in the customary manner by equilibrators 11.

Referring more especially to Figs. 6, 9 and 10, the wheel unit 6 comprises an axle 12 and wheels 13 mounted thereon through roller bearings 14 and equipped with pneumatic tires 15. A transverse semi-elliptic leaf spring 16 shackled to upstanding arm 17 at each end of the axle is centrally clipped as at 18 to an axle housing 19. The housing is held against rotational movement with respect to the axle by means of rubbing blocks 20 fixed to the axle and having sliding engagement with the front and rear vertical walls of the housing.

The housing is formed uni-laterally with a plurality of horizontally projecting brackets 21 (Fig. 3) two of them being preferably provided and arranged at opposite ends of the housing. The brackets are each formed by a pair of vertically spaced plates 22 connected by a web 22a. As shown most clearly in Figs. 9 and 11, the brackets are adapted to engage in radially disposed sockets 23 at the forward corners of the base 24 of the pedestal 5 to constitute a support for the forward side of the mount while the rear side is supported by the split trail members 7—7 hingedly secured to the rear corners of the base. The pedestal mount and the housing are detachably fastened (see Figs. 8, 9, 11 and 12) by means of a latch 25 carried by the housing and engageable in a notch 26 formed in spaced webs 27—27 of the base 24. A cam lever 28 fulcrumed on a pin 29 spanning the webs 27—27 in front of the notch serves to lock the latch in place. The end 28a of the lever when disposed between the spaced webs may be confined between the fingers 30a and 30b of a spring clamp 30 (Fig. 7).

Referring to Fig. 13 the pedestal 5 is a cylindrical member within which is inserted the spindle 8a of the top carriage 8. The spindle is embraced by a spherical self-alining bearing assembly 31 which is assembled in the pedestal 5, and contains an inner race 32 which abuts against an annular member 33 of the spindle when the spindle is dropped into place in the bearing. A tapered adjusting sleeve 34 is provided which is brought up over the lower end of the spindle and adjusted by the nut 35 to take up slack in the bearing. The outer race 36 of the bearing seats on an angular member 37 resting on an annular shoulder of the pedestal and held in place by the adjusting nut 38.

A traversing rack 39 overlying the pedestal 5 loosely embraces the sleeve 33 and is supported in an annular groove formed between a flange 40 on the upper end of the sleeve and a ring 41. The rack is formed with depending arms 42 positioned exteriorly of the pedestal and terminally carrying rollers 43 disposed in vertical slots 44 formed in lugs 45 on the pedestal. The traversing rack therefore is held stationary while the top carriage is rotated although it is free to tilt therewith when the latter is moved as on being cross leveled.

The spindle has a ball and socket connection 46 with a carriage 47 which is movable on a second carriage 48 mounted to slide on rails 49 on the floor of the pedestal. The carriages are movable at right angles to each other through screw shafts 47a and 48a actuated by ratchet levers 50. This structure is more or less conventional and enables the top carriage to be cross leveled.

Referring to Figs. 1 to 4 and 6, the gun carriage includes a pair of beams or rails 51—51 which are hereinafter to be termed outriggers. They are substantially duplicates of the trail members 7 and like them, they are of the box type consisting of thin nickel-steel or duralumin plates riveted or preferably welded together. The larger or forward end of the outriggers are each formed with a head 52 for engagement in one of the sockets 23 of the base 24 of the pedestal. The provision for attachment to the base (Fig. 6) comprises a transverse slot 53 in the upper face of the head for receiving a pin 54 (Fig. 4) passed through apertures 55 (Figs. 12 and 13) in the upper part of the side walls of the socket and an aperture 56 for receiving a wedge 57 passed through apertures 58 in the lower part of side walls of the socket.

In the traveling position the outriggers are slung alongside the folded trail member, the head 52 resting on a hanger 59 of the axle housing while the slot 53 receives a locking pin 60 formed with a lug 61 engaging in a recess 62 in one of a pair of overhead members 63 projecting from the axle housing. The rear ends of the outriggers are each secured to an adjacent trail by means of a supporting mechanism indicated generally at 64.

An elevating jack is carried in the upper face of each of the outriggers (Fig. 10) a short distance in rear of the head 52 and comprises a screw 65 threaded in a fixed nut 66. The outer extremity 67 of the screw is rounded for engagement in a correspondingly shaped recess 68 in the bottom plate of the axle housing 19. Rotation of the screw is effected by means of a hand wheel 69 which is preferably welded thereto.

Securable to the under side of the rear portion of the outrigger (Figs. 1 and 4) is a foldable frame consisting of a pair of pivoted links 70—70, the rear link attachable to the outrigger by means of a removable connecting pin 71 at spaced points on the outrigger. In the position of adjustment shown in Fig. 1, utilizing the rearmost point of attachment 72, the frame is extended and lies flat against the under face of the outrigger, while in the position of adjustment shown in Fig. 4 utilizing the intermediate point of attachment 73, the frame is partially folded to constitute a fulcrum for the outrigger when employed as a lever. A float 74 for engaging the ground in either position of adjustment is mounted at or on the pivotal connection 75 between the links.

On the rear extremity of each of the outriggers is a hook 76 provided for the purpose of engaging the base 24, preferably between the webs 27 when employing the outrigger as a lever.

According to the demands of a particular situation the gun carriage is emplaced for firing with or without the wheeled axle unit. In Fig. 6 in which the adjustment is more or less typical of a light field gun having the characteristic of rapid emplacement, the outriggers are laid on the ground, the elevating jacks raised to engage the housing 19 and take the load off of the springs as well as the pneumatic tires 15. As thus emplaced, the mount is stable while capable of being cross-leveled and it can be elevated to an angle of approximately 90° and traversed through 90°. Within the limits of traverse, the gun can engage aerial targets although primarily emplaced to engage ground targets.

In Fig. 4 wherein the adjustment provides a semi-fixed emplacement characteristic of anti-aircraft guns, the wheeled axle unit is detached from the pedestal which is lowered onto the ground. This is accomplished by employing the outriggers as levers to temporarily support the weight of the top carriage and permit its disconnection from the wheeled axle unit by unfastening the latch. The axle unit is then rolled away from the top carriage to withdraw the brackets from engagement with the base of the pedestal and when this is completed the top carriage is lowered to the ground by relieving pressure on the levers. The levers are then attached to the base of the pedestal through the pin 54 and wedge 57, and in conjunction with the trail member, establish an enlarged base resting on the ground. A spade 77 on the base of the pedestal, spades 78 and 79 on each of the trail members, and the float 74 on each of the outriggers afford secure anchorage.

The procedure of restoring the mount to the traveling position is exactly the reverse of that described for emplacing it. By virtue of the fact that the pedestal may be so readily dissociated from its wheeled axle units, outriggers and trails, it may be mounted directly on the chassis of a commercial truck as schematically indicated in Fig. 5 and the trail members and outriggers may be attached to the pedestal or chassis in any convenient manner.

I claim:

1. In a gun carriage, a wheeled axle unit including a spring suspended housing, a pedestal removably supported by the housing, trail members hinged to the pedestal, a pair of outriggers provided with elevating means and available in one position of adjustment when laid on the ground to support the housing and pedestal and available in another position of adjustment for an engagement with the pedestal corresponding to the engagement of the trail members, means on one end of each of the outriggers for engagement with the pedestal when the outrigger is employed as a lever, and a foldable fulcrum carried by each outrigger.

2. In a gun carriage, a wheeled axle unit including a spring-suspended housing, a pedestal removably attached to the housing for support thereby, trail members carried by the pedestal, outriggers carried separately from the pedestal and in one position of adjustment attachable thereto in lieu of the housing, elevating means carried by each outrigger and in another position of adjustment thereof, engageable with the suspended load to connect it with the ground.

3. In a gun carriage, a wheeled axle unit including a spring suspended housing, a pair of brackets on one side of the housing, a pedestal provided with radially disposed sockets for receiving the brackets of the axle housing, fastening means for detachably connecting the pedestal and axle housing, a trail connected to the pedestal on the side opposite to its connection with the axle housing and outriggers receivable in the sockets of the pedestal in lieu of the brackets.

4. In a gun carriage, a wheeled axle unit including a spring suspended housing, a pair of brackets on one side of the housing, a pedestal provided with sockets for receiving the brackets of the axle housing, fastening means for detachably connecting the pedestal and axle housing, and a trail connected to the pedestal on the side opposite to its connection with the axle housing.

5. In a gun carriage, a wheeled axle unit including a spring suspended housing having supporting means, a pedestal horizontally movable into engagement with the supporting means, and fastening means for detachably connecting the pedestal and axle housing.

6. In a gun carriage, a wheeled axle unit, a pedestal detachably carried thereby, trail members hinged to the pedestal, and outriggers attachable to the pedestal in lieu of the axle unit but available to take the load of the pedestal when the latter is attached to the axle unit.

7. In a gun carriage, a pedestal, a trail connected to one side of the pedestal, a mobile supporting unit detachably connected to the opposite side of the pedestal, and outriggers attachable to said opposite side of the pedestal in lieu of the mobile supporting unit when the pedestal is emplaced on the ground.

8. In a gun carriage, a mobile supporting unit, a pedestal detachably carried thereby, trail members hinged to the pedestal, emplacing members having provision for engagement with the pedestal when employed as a lever to raise or lower the pedestal and a foldable fulcrum carried by each of said emplacing members.

9. In a gun carriage, a mobile supporting unit, a pedestal detachably carried thereby, trail members hinged to the pedestal and emplacing members having provision for engagement with the pedestal when employed as a lever to raise or lower the pedestal.

10. In a gun carriage, a mobile supporting unit, a pedestal detachably carried thereby, trail members hinged to the pedestal, and emplacing members carrying a fulcrum whereby they are employable as levers to raise or lower the pedestal.

11. In a gun carriage, a mobile unit, a pedestal detachably carried thereby, a trail connected to the pedestal, outriggers attachable to the pedestal, a hanger on the mobile unit for supporting one end of each outrigger in traveling position, means for securing that end of the outrigger in place, and means for securing the opposite end of the outrigger to the trail.

12. In a gun mount, a pedestal, a top carriage having a spindle inserted in the pedestal, a spherical self-alining bearing assembly embracing the spindle and supported by the pedestal, a traversing rack overlying the pedestal and mounted on the spindle for rotation relative thereto, depending arms on the rack engaging the exterior of the pedestal for holding the rack against rotation and means for cross leveling the top carriage.

13. In a gun mount, a pedestal, a top carriage having a spindle inserted in the pedestal, a spherical self-alining bearing assembly embracing the spindle and supported by the pedestal, a traversing rack overlying the pedestal and mounted on the spindle for rotation relative thereto, and means for holding the rack against rotation.

GLADEON M. BARNES.